United States Patent
Kawamura et al.

(10) Patent No.: US 6,866,377 B2
(45) Date of Patent: Mar. 15, 2005

(54) INK SET FOR INK-JET RECORDING

(75) Inventors: Masateru Kawamura, Toyoake (JP); Naomichi Kobayashi, Nagoya (JP); Hideo Ohira, Tajimi (JP); Shunichi Higashiyama, Yotsukaichi (JP); Masaya Fujioka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 7 days.

(21) Appl. No.: 10/236,421

(22) Filed: Sep. 6, 2002

(65) Prior Publication Data
US 2003/0058317 A1 Mar. 27, 2003

(30) Foreign Application Priority Data
Sep. 18, 2001 (JP) ......................................... 2001-284057

(51) Int. Cl.[7] .................................................. B41J 2/01
(52) U.S. Cl. ....................... 347/100; 347/95; 106/31.13
(58) Field of Search ........................... 347/100, 95, 96, 347/101, 84, 98; 106/31.13, 31.27, 31.6; 523/160

(56) References Cited

U.S. PATENT DOCUMENTS

| | | | | |
|---|---|---|---|---|
| 6,146,769 A | * | 11/2000 | Anton | 347/100 |
| 6,399,674 B1 | * | 6/2002 | Kashiwazaki et al. | 347/100 |
| 6,426,766 B1 | * | 7/2002 | Shirota et al. | 347/106 |
| 6,460,989 B1 | * | 10/2002 | Yano et al. | 347/100 |
| 6,530,656 B1 | * | 3/2003 | Teraoka et al. | 347/100 |
| 6,540,329 B1 | * | 4/2003 | Kaneko et al. | 347/100 |

FOREIGN PATENT DOCUMENTS

JP  6-24006  2/1994

* cited by examiner

Primary Examiner—Manish Shah
(74) Attorney, Agent, or Firm—Reed Smith LLP

(57) ABSTRACT

An ink set for ink-jet recording includes a first ink which contains glycerol and a first coloring agent, and a second ink which contains a water-soluble organic solvent incompatible with glycerol and a second coloring agent and which does not contain glycerol. The first ink and the second ink are mixed with each other at a low speed. Therefore, the inks permeate into the paper before the inks are mixed with each other. Thus, it is possible to avoid the color bleeding.

22 Claims, 3 Drawing Sheets

INK SET FOR INK-JET RECORDING

BACKGROUND OF THE INVENTION

1. Field of the Invention

The present invention relates to an ink set for ink-jet recording with which the color bleed is reduced and it is possible to perform vivid color recording, and to an ink-jet recording apparatus.

2. Description of the Related Art

In the ink-jet recording method, ink droplets are formed by means of an ink discharging process including, for example, the electrostatic attraction process, a process in which mechanical vibration or displacement is applied to the ink with a piezoelectric element or the like, and a process in which bubbles are generated by heating the ink to utilize the pressure generated thereby, and all or a part of the ink droplets are adhered to a recording objective such as paper to perform the recording.

Those hitherto used as the ink to be used for the ink-jet recording method as described above include those in which a variety of water-soluble dyes or water-dispersible pigments are dissolved or dispersed in liquid media each comprising water or a combination of water and water-soluble organic solvent.

In order to adequately perform the recording for a long period of time by using the ink for ink-jet recording, for example, it is necessary to satisfy the following conditions. That is, the characteristic values including, for example, the viscosity, the surface tension, the electric conductivity, and the density of the ink for ink-jet recording to be used are appropriate values. The recorded image is excellent, for example, in water resistance and light resistance. In order to avoid any clog-up at the nozzle or the orifice of the recording apparatus, no deposited matter is generated and no physical property value is changed by the influence of heat or the like. A large number of suggestions have been made in order to satisfy the conditions as described above. For example, in order to avoid the clog-up at the nozzle or the orifice, a water-soluble organic solvent is generally added.

In order to obtain good printing qualities, exclusive ink-jet paper is sometimes used. However, in recent years, it is more demanded to perform the recording on the regular paper rather than the recording on the exclusive ink-jet paper, in view of the cost and the consideration of the environment. However, in the case of most of the conventional inks, when the recording is performed on the regular paper, the following problems have arisen. That is, the blurring at the ink edge portion, which is called "feathering", is apt to occur. Further, the color bleed is apt to occur, which is caused such that the colors are mixed with each other when the different colors are adjacent to one another. As a result, the printing qualities are deteriorated. Especially, the blurring tends to be conspicuous at the ink boundary, for example, when letters or characters are recorded with a black ink having a relatively dark color on the background of a color ink having a relatively bright color such as yellow, magenta, or cyan.

In order to solve the problems as described above, Japanese Patent Application Laid-open No. 6-24006 discloses a method in which a black ink and a color ink are allowed to have different surface tensions to avoid the color bleed. However, in the case of this method, for example, it is necessary that the one dot unit of the black ink is constituted with a plurality of ink droplets due to the difference in surface tension. Further, it is necessary that the black ink and the color ink are subjected to the recording with a certain time difference. Therefore, this method involves a lot of restrictions for the printer mechanism.

SUMMARY OF THE INVENTION

The present invention has been made in order to solve the problems as described above, an object of which is to provide an ink set for ink-jet recording and an ink-jet recording apparatus including the same, in which it is possible to reduce the color bleed without requiring any special mechanism for a printer even in the case of the use for the recording on the regular paper.

According to a first aspect of the present invention, there is provided an ink set for ink-jet recording comprising a first ink which contains glycerol and a first coloring agent, and a second ink which contains a water-soluble organic solvent incompatible with glycerol and a second coloring agent and which does not contain glycerol.

The present inventors have found out that the speed, at which inks containing incompatible solvents are mixed with each other, is sufficiently slower than the speed at which inks containing compatible solvents are mixed with each other. Further, the present inventors have found out the organic solvent which is not compatible with glycerol and which is preferably added to the ink for ink-jet recording. Based on the findings, the present inventors have achieved the invention. That is, the speed, at which the inks are mixed with each other when the ink containing glycerol and the ink containing the water-soluble organic solvent incompatible with glycerol to be used for the ink set for ink-jet recording of the present invention are subjected to the recording adjacently on the regular paper, is sufficiently slower than the speed at which the inks containing glycerol are mixed with each other, or the inks containing water-soluble organic solvents incompatible with glycerol are mixed with each other. As a result, the respective inks permeate into the regular paper and the inks are dried, before the inks are progressively mixed with each other. Thus, it is possible to reduce the bleed.

According to a second aspect of the present invention, there is provided an ink-jet recording apparatus comprising an ink-jet head; an ink tank which accommodates an ink to be supplied to the ink-jet head; and an ink set which is accommodated in the ink tank; wherein the ink set comprises a first ink which contains glycerol and a first coloring agent, and a second ink which contains a water-soluble organic solvent incompatible with glycerol and a second coloring agent and which does not contain glycerol. The first ink may be a black ink and the second ink may be a color ink. The ink set may further comprise a third ink which does not contain glycerol and contains a water-soluble organic solvent incompatible with glycerol and a third coloring agent, and a fourth ink which does not contain glycerol and which contains a water-soluble organic solvent incompatible with glycerol and a fourth coloring agent. The ink tank may be an ink container fixedly provided in the ink-jet recording apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
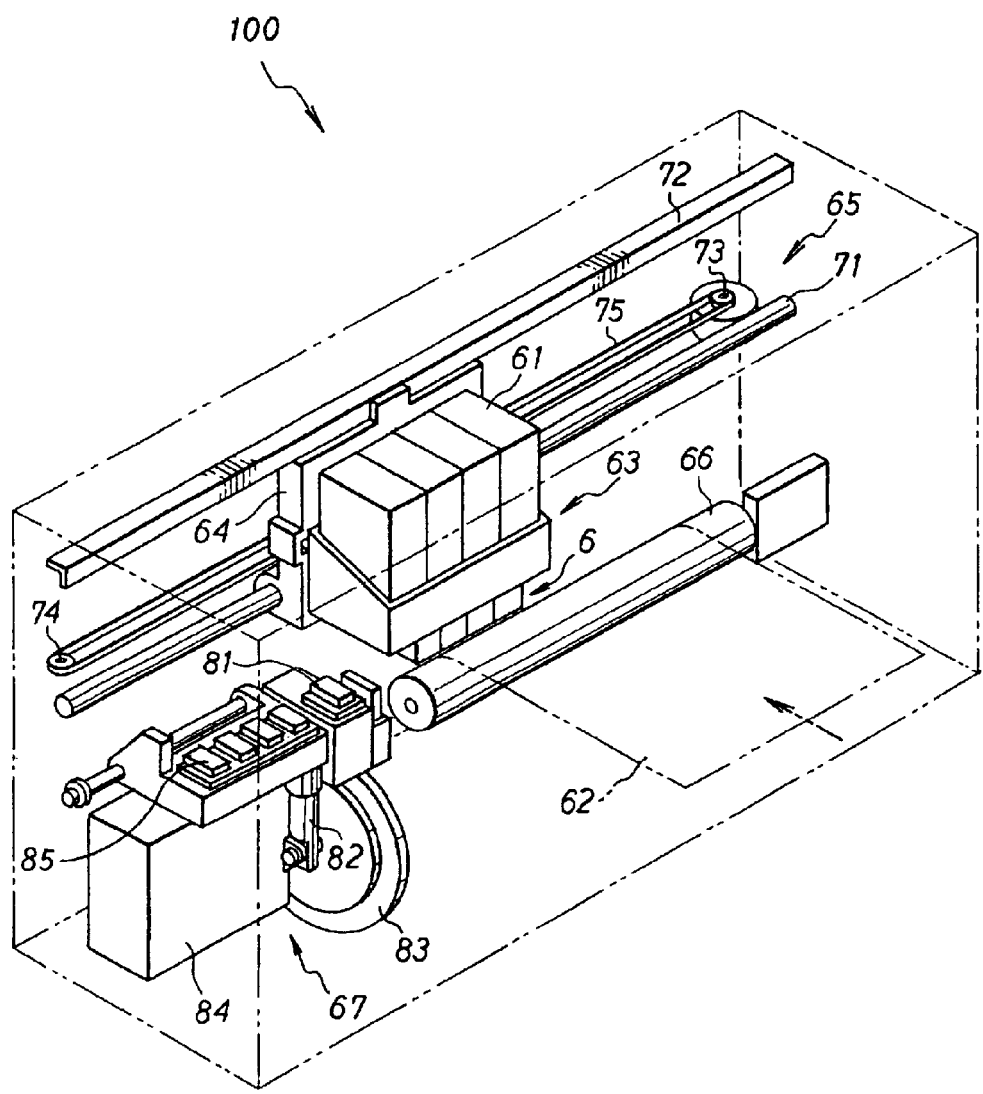
FIG. 1 is a perspective view showing a color ink-jet printer having an ink cartridge which contains color ink set prepared in examples of the invention.

At least one ink having a certain color, which is included in the ink set for ink-jet recording of the present invention, is the ink containing glycerol. Glycerol adjusts the viscosity of the ink, and it is preferably used as a moistening agent to avoid the clog-up of the nozzle which would be otherwise caused by evaporation and drying of water. The blending amount of glycerol is generally 2 to 50% by weight with respect to the total amount of the ink. The ink, which contains glycerol, may contain the water-soluble organic solvent incompatible with glycerol, in such an amount that the printing characteristics of the ink are not inhibited.

All of the inks other than the ink containing glycerol, which are included in the ink set for ink-jet recording of the present invention, contain substantially no glycerol, and they contain the water-soluble organic solvent incompatible with glycerol. The water-soluble organic solvent, which is incompatible with glycerol, is not specifically limited. However, those preferably used include, for example, ethylene glycol dimethyl ether, diethylene glycol dimethyl ether, triethylene glycol dimethyl ether, and tetraethylene glycol dimethyl ether. The water-soluble organic solvent, which is incompatible with glycerol, is preferably used in an amount of 1 to 50% by weight with respect to the total amount of the ink. If the amount is less than 1% by weight, it might be impossible to sufficiently obtain the effect to reduce the color bleed in some cases. If the amount exceeds 50% by weight, for example, the following problems arise in some cases. That is, the ink has an excessively high viscosity, and the discharge failure is caused. The amount is more preferably 3 to 40% by weight and much more preferably 5 to 30% by weight. The water-soluble organic solvent incompatible with glycerol may be used singly. Alternatively, two or more of the water-soluble organic solvents incompatible with glycerol may be used in combination.

The ink, which is used for the ink set for ink-jet recording of the present invention, may be based on the use of glycerol and the water-soluble organic solvent incompatible with glycerol in combination with another water-soluble organic solvent other than the above. The another water-soluble organic solvent includes, for example, alkyl alcohols having a number of carbon or carbons of 1 to 5 such as methyl alcohol, ethyl alcohol, propyl alcohol, and butyl alcohol; amides such as dimethylformamide and dimethylacetamide; ketones or ketone alcohols such as acetone and diacetone alcohol; ethers such as tetrahydrofuran and dioxane; alkylene glycols with alkylene group having a number of carbon atoms of 2 to 6 such as ethylene glycol, propylene glycol, triethylene glycol, and diethylene glycol; polyalkylene glycols such as polyethylene glycol and polypropylene glycol; sulfolane, pyrrolidone, methyl-2-pyrrolidone, 1,3-dimethyl-2-imidazolidinone, and 1,5-pentanediol.

For example, dyes and pigments may be used as the coloring agent for the ink to be used for the ink set for ink-jet recording of the present invention. The dye includes, for example, water-soluble dyes such as direct dyes, acidic dyes, basic dyes, and reactive dyes. Performance such as vividness, water solubility, stability, and light resistance is required for the dye. The dye, which satisfies the performance and which is preferably used for the ink for ink-jet recording, is not specifically limited. However, those preferably usable and commercially available include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

As for the pigment, it is possible to use carbon black as well as many inorganic pigments and many organic pigments. The organic pigment is not specifically limited, which includes, for example, azo pigment such as azo lake, insoluble azo pigment, condensed azo pigment, and chelate azo pigment; polycyclic pigment such as phthalocyanine pigment, perylene and perynone pigments, anthraquinone pigment, quinacridone pigment, dioxazine pigment, thioindigo pigment, isoindolinone pigment, and quinophthalone pigment; dye lake such as basic dye type lake and acidic dye type lake; nitro pigment, nitroso pigment, and aniline black daylight fluorescent pigment. The inorganic pigment is not specifically limited, which includes, for example, titanium oxide, iron oxide-based pigment, and carbon black-based pigment. Other pigments are also usable provided that they are dispersible in the aqueous phase. For example, it is also possible to use those obtained by surface-treating the pigment such as graft carbon, for example, with a surfactant or a polymer dispersing agent.

When the pigment is used as the coloring agent, the pigment is subjected to a dispersing treatment together with an appropriate dispersing agent, a solvent, pure water, and optionally other additives.

For example, polymer dispersing agents and surfactants, which have been hitherto known, may be used as the dispersing agent. The polymer dispersing agent includes, for example, protein such as gelatin and albumin; natural rubber such as gum arabic and gum traganth; glucoside such as saponin; cellulose derivative such as methyl cellulose, carboxy cellulose, and hydroxymethyl cellulose; natural polymer such as lignosulfonate and shellac; anionic polymer such as salt of polyacrylic acid, salt of styrene-acrylic acid copolymer, salt of vinylnaphthalene-acrylic acid copolymer, salt of styrene-maleic acid copolymer, salt of vinylnaphthalene-maleic acid copolymer, and sodium salt and phosphoric acid salt of β-naphthalenesulfonic acid-formalin condensate; and nonionic polymer such as polyvinyl alcohol, polyvinyl pyrrolidone, and polyethylene glycol.

The surfactant includes, for example, anionic surfactant such as higher alcohol sulfuric acid ester salt, liquid fatty oil sulfuric acid ester salt, and alkylarylsulfonic acid salt; and nonionic surfactant such as polyoxyethylene alky ether, polyoxyethylene alkyl ester, sorbitan alkyl ester, and polyoxyethylene sorbitan alkyl ester. The dispersing agent may be used singly, or two or more of the dispersing agents may be used in combination. It is preferable that the dispersing agent is blended in an amount of 0.01 to 20% by weight with respect to the total amount of the ink.

The method for dispersing the pigment in the ink is not specifically limited. However, it is preferable to use a method based on the use of a dispersing machine. The dispersing machine is not specifically limited, which includes, for example, general dispersing machines such as ball mills, roll mills, and sand mills. Especially, it is preferable to use a high speed type sand mill.

The dye and the pigment may be used singly respectively. Alternatively, two or more dyes, two or more pigments, or two or more dyes and pigments may be mixed and used. The dye and the pigment are generally used in an amount of 0.1 to 20% by weight with respect to the total amount of the ink to be used for the ink set for ink-jet recording of the present invention. If the amount is less than 0.1% by weight, it is impossible to sufficiently develop the color on the regular paper in some cases. If the amount exceeds 20% by weight, the coloring agent is deposited and aggregated in the ink in some cases. The dye and/or the pigment is preferably used in an amount of 0.3 to 1.5% by weight, and more preferably 0.5 to 10% by weight.

It is preferable that water is used for the solvent of the ink to be used for the ink set for ink-jet recording of the present invention. As for the water, it is preferable to use water having high purity such as ion exchange water and distilled water, rather than ordinary water. The blending amount of the water may be determined in a wide range depending on the type and the composition of the coloring agent and the water-soluble organic solvent or the characteristics of the desired ink. However, it is preferable that the blending amount is 10 to 98% by weight with respect to the total amount of the ink. If the blending amount is less than 10% by weight, then the viscosity of the ink is too high, and it is difficult to discharge the ink from the head. If the blending amount exceeds 98% by weight, the ink is dried excessively easily. The blending amount is more preferably 30 to 97% by weight, and much more preferably 40 to 95% by weight.

The ink to be used for the ink set for ink-jet recording of the present invention may contain polyoxyalkylene glycol-n-alkyl ether in order to control the permeability. It is preferable for the polyoxyalkylene glycol-n-alkyl ether that the number of carbon or carbons of the alkyl group is not more than 5, and the number of carbon or carbons of the oxyalkylene group is not more than 12. If the number of carbon or carbons of the alkyl group of the polyoxyalkylene glycol-n-alkyl ether exceeds 5, or if the number of carbon or carbons of the oxyalkylene group exceeds 12, then the viscosity is intensely increased, which is not suitable for the material for the ink for ink-jet recording in some cases.

The polyoxyalkylene glycol-n-alkyl ether includes, for example, glycol ethers represented by alkyl ethers based on ethylene glycol and propylene glycol.

The glycol ether based on ethylene glycol includes, for example, ethylene glycol-n-methyl ether, ethylene glycol-n-ethyl ether, ethylene glycol-n-propyl ether, ethylene glycol-n-butyl ether, ethylene glycol-n-isobutyl ether, diethylene glycol-n-methyl ether, diethylene glycol-n-ethyl ether, diethylene glycol-n-propyl ether, diethylene glycol-n-butyl ether, diethylene glycol-n-isobutyl ether, triethylene glycol-n-methyl ether, triethylene glycol-n-ethyl ether, triethylene glycol-n-propyl ether, triethylene glycol-n-butyl ether, and triethylene glycol-n-isobutyl ether.

The glycol ether based on propylene glycol includes, for example, propylene glycol-n-methyl ether, propylene glycol-n-ethyl ether, propylene glycol-n-propyl ether, propylene glycol-n-isopropyl ether, propylene glycol-n-butyl ether, dipropylene glycol-n-methyl ether, dipropylene glycol-n-ethyl ether, dipropylene glycol-n-propyl ether, dipropylene glycol-n-isopropyl ether, dipropylene glycol-n-butyl ether, tripropylene glycol-n-methyl ether, tripropylene glycol-n-ethyl ether, tripropylene glycol-n-propyl ether, and tripropylene glycol-n-isopropyl ether.

The ink to be used for the ink set for ink-jet recording of the present invention may optionally contain, for example, hitherto known various types of viscosity-adjusting agents, surface tension-adjusting agents, pH-adjusting agents, antiseptic agents, and fungicides. When the ink for the ink-jet recording method in which the recording liquid is electrically charged is prepared, a specific resistance-adjusting agent including, for example, inorganic salts such as lithium chloride, ammonium chloride, and sodium chloride is further added. When the ink for the ink-jet method in which the ink is discharged in accordance with the action of the thermal energy is prepared, for example, values of thermal physical properties including, for example, the specific heat, the coefficient of thermal expansion, and the coefficient of thermal conductivity are adjusted in some cases.

Although not specifically limited, the ink set for ink-jet recording of the present invention is usually and preferably composed of inks of four colors of black, yellow, magenta, and cyan. When the present invention is used in order to reduce the color bleed at adjoining portions of the black ink and the color ink in the combination as described above, for example, the inks are combined as follows. That is, when the black ink is the ink containing glycerol, it is preferable that the color inks of the three colors of yellow, magenta, and cyan are the inks each containing the water-soluble organic solvent incompatible with glycerol. When the black ink is the ink containing the water-soluble organic solvent incompatible with glycerol, it is preferable that the color inks of the three colors of yellow, magenta, and cyan are the inks each containing glycerol.

As described above, the problems involved in the conventional technique are sufficiently solved in the ink set for ink-jet recording of the present invention. It is possible to realize the reduction of color bleed even when the recording is performed on the regular paper. It is possible to give the vivid color recording.

The present invention will be explained in further detail below as exemplified by examples. However, the present invention is not limited to only the examples.

EXAMPLE 1

Inks having the following compositions were prepared respectively, and they were used collectively as an ink set for ink-jet recording.

Composition of Black Ink
CAB-O-JET 300 BLACK (produced by CABOT): 33% by weight;
Glycerol: 30% by weight;
Pure water: 37% by weight.

Composition of Cyan Ink
C. I. Direct Blue 199: 2% by weight;
Tetraethylene glycol dimethyl ether: 30% by weight;
Pure water: 68% by weight.

Composition of Magenta Ink
C. I. Direct Red 227: 2% by weight;
Tetraethylene glycol dimethyl ether: 30% by weight;
Pure water: 68% by weight.

Composition of Yellow Ink
C. I. Direct Yellow 142: 2% by weight;
Tetraethylene glycol dimethyl ether: 30% by weight;
Pure water: 68% by weight.

EXAMPLE 2

Inks having the following compositions were prepared respectively, and they were used collectively as an ink set for ink-jet recording.

Composition of Black Ink
  CAB-O-JET 300 BLACK (produced by CABOT): 33% by weight;
  Glycerol: 30% by weight;
  Pure water: 37% by weight.
Composition of Cyan Ink
  C. I. Acid Blue 9: 2% by weight;
  Ethylene glycol dimethyl ether: 5% by weight;
  Polyethylene glycol (average molecular weight: 200): 25% by weight;
  Pure water: 68% by weight.
Composition of Magenta Ink
  C. I. Acid Red 52: 2% by weight;
  Ethylene glycol dimethyl ether: 5% by weight;
  Polyethylene glycol (average molecular weight: 200): 25% by weight;
  Pure water: 68% by weight.
Composition of Yellow Ink
  C. I. Acid Yellow 23: 2% by weight;
  Ethylene glycol dimethyl ether: 5% by weight;
  Polyethylene glycol (average molecular weight: 200): 25% by weight;
  Pure water: 68% by weight.

EXAMPLE 3

Inks having the following compositions were prepared respectively, and they were used collectively as an ink set for ink-jet recording.
Composition of Black Ink
  CAB-O-JET 200 BLACK (produced by CABOT): 25% by weight;
  Triethylene glycol dimethyl ether: 10% by weight;
  Polyethylene glycol (average molecular weight: 200): 15% by weight;
  Pure water: 50% by weight.
Composition of Cyan Ink
  C. I. Direct Blue 199: 2% by weight;
  Glycerol: 25% by weight;
  Pure water: 73% by weight.
Composition of Magenta Ink
  C. I. Direct Red 227: 2% by weight;
  Glycerol: 25% by weight;
  Pure water: 73% by weight.
Composition of Yellow Ink
  C. I. Direct Yellow 142: 2% by weight;
  Glycerol: 25% by weight;
  Pure water: 73% by weight.

EXAMPLE 4

Inks having the following compositions were prepared respectively, and they were used collectively as an ink set for ink-jet recording.
Composition of Black Ink
  C. I. Direct Black 154: 2% by weight;
  C. I. Direct Black 19: 2% by weight;
  Glycerol: 18% by weight;
  Pure water: 78% by weight.
Composition of Cyan Ink
  C. I. Direct Blue 199: 2% by weight;
  Diethylene glycol dimethyl ether: 15% by weight;
  Polyethylene glycol (average molecular weight: 200): 10% by weight;
  Pure water: 73% by weight.
Composition of Magenta Ink
  C. I. Direct Red 227: 2% by weight;
  Diethylene glycol dimethyl ether: 15% by weight;
  Polyethylene glycol (average molecular weight: 200): 10% by weight;
  Pure water: 73% by weight.
Composition of Yellow Ink
  C. I. Direct Yellow 142: 2% by weight;
  Diethylene glycol dimethyl ether: 15% by weight;
  Polyethylene glycol (average molecular weight: 200): 10% by weight;
  Pure water: 73% by weight.

EXAMPLE 5

Inks having the following compositions were prepared respectively, and they were used collectively as an ink set for ink-jet recording.
Composition of Black Ink
  CAB-O-JET 300 BLACK (produced by CABOT): 33% by weight;
  Glycerol: 30% by weight;
  Pure water: 37% by weight.
Composition of Cyan Ink
  C. I. Acid Blue 9: 2% by weight;
  Tetraethylene glycol dimethyl ether: 3% by weight;
  Propylene glycol: 25% by weight;
  Pure water: 70% by weight.
Composition of Magenta Ink
  C. I. Acid Red 52: 2% by weight;
  Tetraethylene glycol dimethyl ether: 3% by weight;
  Propylene glycol: 25% by weight;
  Pure water: 70% by weight.
Composition of Yellow Ink
  C. I. Acid Yellow 23: 2% by weight;
  Tetraethylene glycol dimethyl ether: 3% by weight;
  Propylene glycol: 25% by weight;
  Pure water: 70% by weight.

COMPARATIVE EXAMPLE 1

Inks were prepared in the same manner as in Example 1 except that glycerol was added in place of tetraethylene glycol dimethyl ether when each of cyan, magenta, and yellow inks was prepared, and the obtained inks were collectively used as an ink set for ink-jet recording.

COMPARATIVE EXAMPLE 2

Inks were prepared in the same manner as in Example 3 except that triethylene glycol dimethyl ether was not added and polyethylene glycol (average molecular weight: 200) was used in an increased amount to balance the omission of triethylene glycol dimethyl ether when black ink was prepared, and the obtained inks were collectively used as an ink set for ink-jet recording.

COMPARATIVE EXAMPLE 3

Inks were prepared in the same manner as in Example 4 except that diethylene glycol was added in place of diethylene glycol dimethyl ether when each of cyan, magenta, and yellow inks was prepared, and the obtained inks were collectively used as an ink set for ink-jet recording.

COMPARATIVE EXAMPLE 4

Inks were prepared in the same manner as in Example 1 except that diethylene glycol was added in place of glycerol when black ink was prepared, and the obtained inks were collectively used as an ink set for ink-jet recording.

Evaluation of Performance

The respective materials were sufficiently mixed and agitated for the inks obtained in Examples 1 to 5 and Comparative Examples 1 to 4, followed by performing filtration with a membrane filter of 0.8 μm to use the obtained inks for the evaluation of recording.

The recording was performed by using the inks described above while combining the inks of two colors so that the letter color and the background color were obtained respectively on recording samples. The evaluation was directed to the blur at the boundary at which the colors were mixed with each other and to the distinction of letters. Letters, which were recorded without any background of each of the colors, were used for a recording sample to serve as an evaluation standard. The letter size was set to 11 point with Microsoft Word 97. The recording was performed on regular paper (Xerox 4200) by using an ink-jet printer having a multi-head of the on-demand type (discharge orifice diameter: 35 μm, resistance value of heating resistor: 150 Ω, driving voltage: 30 V, frequency: 2 kHz) for performing the recording by discharging droplets by applying the thermal energy to the ink in the recording head.

The recording samples was evaluated for the degree of blur of the letters with the background as compared with the letters with no background in accordance with visual evaluation. The evaluation criterion is as follows:

++: the color bleed is scarcely observed, and the equivalent vividness is obtained as compared with the letters with no background;
+: the color bleed is slightly generated, but the letters are sufficiently readable;
±: the color bleed is clearly generated, but the letters are readable; and
−: the color bleed is clearly generated, and the letters are difficult to be read as well. Table 1 shows obtained results.

TABLE 1

| Letter × background | Example | | | | | Comparative Example | | | |
|---|---|---|---|---|---|---|---|---|---|
| | 1 | 2 | 3 | 4 | 5 | 1 | 2 | 3 | 4 |
| Black letter × cyan background | ++ | ++ | ++ | ++ | + | − | − | − | ± |
| Black letter × magenta background | ++ | ++ | ++ | ++ | + | − | − | − | ± |
| Black letter × yellow background | ++ | ++ | ++ | ++ | + | − | − | − | − |
| Cyan letter × black background | ++ | ++ | ++ | ++ | + | − | − | − | ± |
| Magenta letter × black background | ++ | ++ | ++ | ++ | + | − | − | − | ± |
| Yellow letter × black background | ++ | ++ | ++ | ++ | + | − | − | − | − |

As shown in Table 1, the blurring, which would be otherwise caused by the color bleed at the boundary portions of the inks, was scarcely observed in the recording samples prepared in respective Examples.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
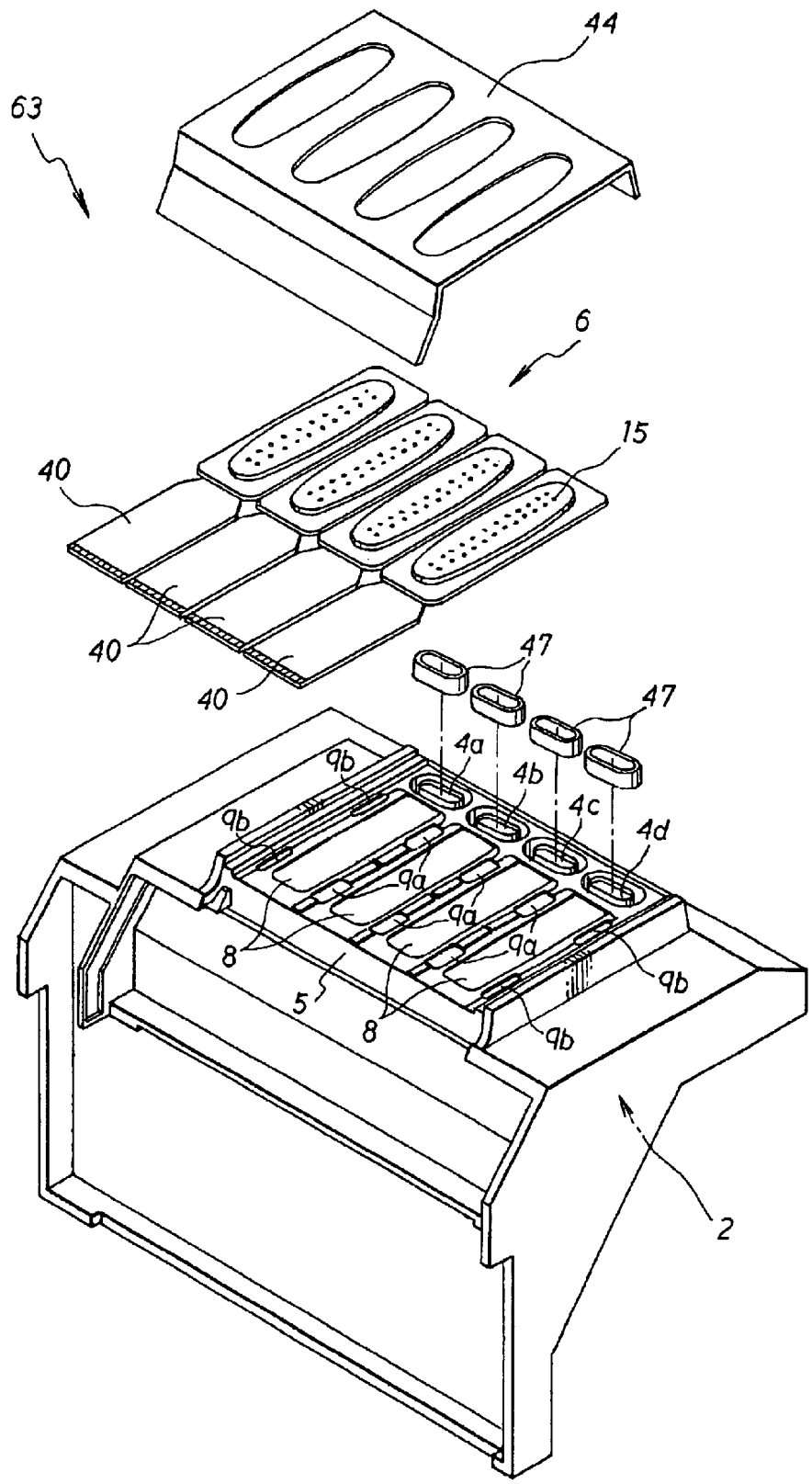
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
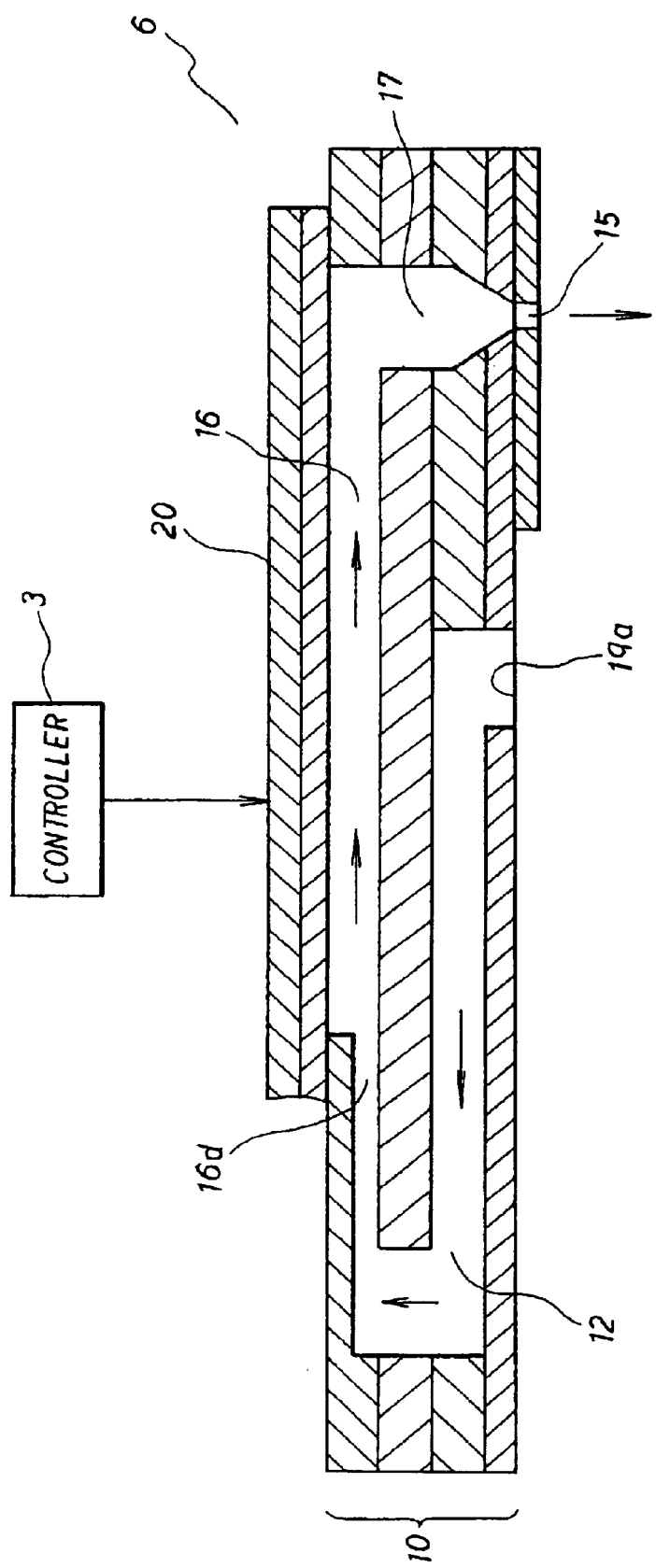
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

The present invention is constructed as described above. Therefore, the ink set for ink-jet recording is successfully provided, in which it is possible to reduce the feathering and the color bleed and it is possible to perform the vivid color recording without requiring any special mechanism for a printer even in the case of the use for the recording on the regular paper.

What is claimed is:

1. An ink set for ink-jet recording comprising:
   a first ink which contains glycerol and a first coloring agent; and
   a second ink which contains a water-soluble organic solvent incompatible with glycerol and a second coloring agent and which does not contain glycerol.

2. The ink set according to claim 1, wherein the water-soluble organic solvent, which is incompatible with glycerol, is at least one selected from the group consisting of ethylene glycol dimethyl ether, diethylene glycol dimethyl ether, triethylene glycol dimethyl ether, and tetraethylene glycol dimethyl ether.

3. The ink set according to claim 1, wherein the water-soluble organic solvent is contained in the ink in an amount of 5 to 30% by weight.

4. The ink set according to claim 1, wherein the first ink is a black ink and the second ink is a color ink.

5. The ink set according to claim 1, further comprising a third ink which does not contain glycerol and contains a water-soluble organic solvent incompatible with glycerol and a third coloring agent, and a fourth ink which does not contain glycerol and contains a water-soluble organic solvent incompatible with glycerol and a fourth coloring agent.

6. An ink-jet recording apparatus comprising:
   an ink-jet head;
   an ink tank which accommodates an ink to be supplied to the ink-jet head; and
   an ink set which is accommodated in the ink tank, wherein:
      the ink set comprises a first ink which contains glycerol and a first coloring agent, and a second ink which contains a water-soluble organic solvent incompatible with glycerol and a second coloring agent and which does not contain glycerol.

7. The ink-jet recording apparatus according to claim 6, wherein the water-soluble organic solvent, which is incompatible with glycerol, is at lease one selected from the group consisting of ethylene glycol dimethyl ether, diethylene glycol dimethyl ether, triethylene glycol dimethyl ether, and tetraethylene glycol dimethyl ether.

8. The ink-jet recording apparatus according to claim 6, wherein the water-soluble organic solvent is contained in the ink in an amount of 5 to 30% by weight.

9. The ink-jet recording apparatus according to claim 6, wherein the first ink is a black ink and the second ink is a color ink.

10. The ink-jet recording apparatus according to claim 6, further comprising a third ink which does not contain glycerol and contains a water-soluble organic solvent incompatible with glycerol and a third coloring agent, and a fourth ink which does not contain glycerol and contains a water-soluble organic solvent incompatible with glycerol and a fourth coloring agent.

11. The ink-jet recording apparatus according to claim 6, wherein the ink tank is an ink cartridge.

12. An ink set for ink-jet recording comprising:
   a first ink, which contains a water-soluble organic solvent incompatible with glycerol and a first coloring agent, and which does not contain glycerol, wherein the first ink is black ink; and
   a second ink which contains glycerol and a second coloring agent.

13. The ink set according to claim 12, wherein the water-soluble organic solvent, which is incompatible with glycerol, is at least one selected from the group consisting of ethylene glycol dimethyl ether, diethylene glycol dimethyl ether, triethylene glycol dimethyl ether, and tetraethylene glycol dimethyl ether.

14. The ink set according to claim 12, wherein the water-soluble organic solvent is contained in the ink in an amount of 5 to 30% by weight.

15. The ink set according to claim 12, wherein the second coloring agent is a Direct Blue dye, a Direct Red dye or a Direct Yellow dye.

16. The ink set according to claim 12, further comprising a third ink which contains glycerol and a third coloring agent, and a fourth ink which contains glycerol and a fourth coloring agent.

17. An ink-jet recording apparatus comprising:
   an ink-jet head;
   an ink tank which accommodates an ink to be supplied to the ink-jet head; and
   an ink set which is accommodated in the ink tank, wherein:
      the ink set comprises a first ink, which contains a water-soluble organic solvent incompatible with glycerol and a first coloring agent, and which does not contain glycerol, wherein the first ink is black ink, and a second ink which contains glycerol and a second coloring agent.

18. The ink-jet recording apparatus according to claim 17, wherein the water-soluble organic solvent, which is incompatible with glycerol, is at lease one selected from the group consisting of ethylene glycol dimethyl ether, diethylene glycol dimethyl ether, triethylene glycol dimethyl ether, and tetraethylene glycol dimethyl ether.

19. The ink-jet recording apparatus according to claim 17, wherein the water-soluble organic solvent is contained in the ink in an amount of 5 to 30% by weight.

20. The ink-jet recording apparatus according to claim 17, wherein the second coloring agent is a Direct Blue dye, a Direct Red dye or a Direct Yellow dye.

21. The ink-jet recording apparatus according to claim 17, further comprising a third ink which contains glycerol and a third coloring agent, and a fourth ink which contains glycerol and a fourth coloring agent.

22. The ink-jet recording apparatus according to claim 17, wherein the ink tank is an ink cartridge.

* * * * *